3,402,024
METHOD OF TREATING ALUMINA

Paul A. Marshall, Jr., Boalsburg, Paul A. Rishel, Centre Hall, Harry Roman, Boalsburg, Pa., assignors to the United States of America as represented by the Secretary of the Army
No Drawing. Filed Nov. 22, 1963, Ser. No. 391,822
3 Claims. (Cl. 23—293)

ABSTRACT OF THE DISCLOSURE

A polycrystalline alumina ceramic is treated with hydrofluoric acid to soften the ceramic and render it machineable. This treatment allows penetration into the ceramic to a depth necessary for machining. The softened ceramic is then ground to the desired tolerances, and the shaped product refired at temperatures within the range of 1400 to 1600° C.

---

This invention relates in general to a method of changing the physical and chemical properties of alumina and in particular, to a method of changing the physical and chemical properties of a commercial polycrystalline high purity alumina ceramic. By the term commercial polycrystalline high purity alumina is meant alumina, the aluminum oxide content of which various from 85 to 99 percent.

Of all the new ceramic materials, aluminum oxide probably has the widest diversity of uses and the greatest potentialities. Its outstanding mechanical strength, excellent thermal shock resistance, excellent electrical properties (high dielectric strength, low power factor, etc.) and its chemical and abrasion resistance, make it well suited to a variety of applications.

Alumina ceramics are fired ceramic compositions in which the major crystal phase is alpha alumina or corundum. The aluminum oxide content is usually 75 to 100 percent, and the parts are fired at temperatures ranging from 2600° F. to 3200° F., or higher on a commercial scale. In the case of polycrystalline commercial high purity alumina, the aluminum oxide content varies from 85 to 99 percent. As the fired parts are extremely hard, it is necessary to use time consuming and expensive techniques as for example, diamond wheels or diamond tools, to grind the fired parts to the desired tolerances. Because of this, the manufacture of alumina ceramics in more complex shapes is not currently feasible.

An object of this invention is to provide a relatively simple and economic method for making precision alumina parts. A further object is to provide a relatively simple and economic method whereby conventionally produced alumina parts can be modified to close tolerances. A still further object is to provide a relatively simple and economic method whereby precision alumina parts can be fabricated for use in radomes, microcircuit substrates, coil forms, and a variety of ceramic insulators.

It has now been found that the above objectives can be attained by a method that comprises treating the polycrystalline alumina ceramic with hydrofluoric acid to soften the ceramic and then refiring the softened ceramic at high temperatures. In this method of reconstituting the alumina ceramic, it is easy to grind the softened ceramic to the desired high tolerances prior to subsequent rehardening by a refiring treatment.

The following examples are illustrative of the method of the invention.

EXAMPLE 1

A micromodule prepared from commercial high purity alumina having an aluminum oxide content of 96 to 97 percent is immersed for five hours in 52 percent aqueous hydrofluoric acid. After softening the micromodule is rehardened by refiring at temperatures of 1400 to 1600° C. A weight loss up to 3 percent is found in the refired ceramic.

EXAMPLE 2

An alumina tube of commercial high purity in subjected to an intense treatment with gaseous hydrofluoric acid at low temperatures. The alumina tube is then refired at 1500° C. to reconstitute it to its original hardness.

EXAMPLE 3

Polycrystalline alumina having an aluminum oxide content of approximately 96 percent is immersed in aqueous hydrofluoric acid and found to evidence a reduction in hardness from 7.5 to 3.5 on the Mho's hardness scale. In the softened condition, the alumina part is easily cut with a carbide tipped tool to the depth of penetration of the reaction, but no further. Since the reaction proceeds from the surface, inward, the time of immersion controls the depth of penetration, and consequently the depth to which the alumina ceramic will be softened. Reconstitution by firing at 1500 to 1550° C. returns the Mho's hardness to the original value and restores the electrical properties, that is, the dissipation factor.

EXAMPLE 4

Commercial high purity alumina micromodule wafers having an average breaking strength of approximately 1800 grams under a ball point load are immersed in aqueous hydrofluoric acid for a period sufficient to thoroughly penetrate the part. After the immersion period, the wafers have an average breaking strength of 500 to 600 grams under the ball point load. Refiring at 1550° C. for 45 minutes restores the breaking strength to approximately 1650 grams. Although this is somewhat below the original strength values, the results suggest that further restoration of mechanical strength can be attained by either extending the time or temperature of refiring.

In the method of the invention the immersion of the alumina ceramic in aqueous hydrofluoric acid has the same effect as treating the alumina ceramic with gaseous hydrofluoric acid. In both cases, the degree of softening and the rate of softening depends as much on grain size, porosity, and original firing temperature as on the purity of the body.

The dimensional stability of the reconstituted parts depends on the intended application. For example, to take advantage of the machineability of "softened" alumina, one only has to allow the depth of penetration of the attack zone to reach that dimension necessary for machining.

The foregoing description is intended to be illustrative of the invention and not in limitation thereof.

What is claimed is:
1. A method of treating fired alumina ceramics, the aluminum oxide content of which varies from 85 to 99 percent, to soften said ceramic and render it machineable, said method including the steps of
(a) contacting said alumina with hydrofluoric acid in an amount and for a time sufficient to allow penetration to a depth necessary for machining,
(b) grinding the softened alumina to the desired tolerances, and
(c) refiring the shaped product at temperatures within the range of 1400 to 1600° C.

2. The method according to claim 1 wherein the alumina ceramic is treated with gaseous hydrofluoric acid.

3. The method according to claim 1 wherein the alumina ceramic is treated with aqueous hydrofluoric acid.

References Cited

UNITED STATES PATENTS

| 2,411,806 | 11/1946 | Riesmeyer et al. | 23—143 |
| 2,411,807 | 11/1946 | Riesmeyer et al. | 23—143 |
| 2,887,361 | 5/1959 | Fenerty | 23—142 |
| 2,961,297 | 11/1960 | Fenerty | 23—142 |

FOREIGN PATENTS

| 864,009 | 3/1961 | Great Britain. |

OSCAR R. VERTZ, *Primary Examiner.*

H. T. CARTER, *Assistant Examiner.*